United States Patent
Gopal et al.

(10) Patent No.: US 9,612,647 B2
(45) Date of Patent: Apr. 4, 2017

(54) POWER MANAGEMENT FOR A PHYSICAL LAYER INTERFACE CONNECTING A DISPLAY PANEL TO A DISPLAY TRANSMIT ENGINE

(71) Applicant: Intel Corporation, Santa Clara, CA (US)

(72) Inventors: Sathyanarayanan Gopal, Fremont, CA (US); Sanjib Basu, Bangalore (IN); Pravas Pradhan, Bangalore (IN); Prakash K. Radhakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 14/074,985

(22) Filed: Nov. 8, 2013

(65) Prior Publication Data
US 2015/0134985 A1    May 14, 2015

(51) Int. Cl.
*G06F 1/32*    (2006.01)
*G06F 1/26*    (2006.01)

(52) U.S. Cl.
CPC .............. *G06F 1/3265* (2013.01); *G06F 1/26* (2013.01); *G06F 1/32* (2013.01); *G06F 1/3287* (2013.01); *Y02B 60/1242* (2013.01); *Y02B 60/1282* (2013.01)

(58) Field of Classification Search
CPC ..... G06F 1/32; G06F 1/26; G06F 1/28; G06F 1/00
USPC ....... 713/300, 310, 320, 321, 322, 323, 324, 713/330, 340, 375
See application file for complete search history.

(56) References Cited

U.S. PATENT DOCUMENTS

| 6,167,321 | A  | * | 12/2000 | Chan ................ H03K 19/00315 327/143 |
| 9,128,713 | B2 | * | 9/2015 | Knausz ................. G06F 1/3218 |
| 2008/0309395 | A1 | * | 12/2008 | Kaneko ............ H03K 19/01812 327/333 |
| 2009/0039956 | A1 | * | 2/2009 | Mo ........................... H03F 3/08 330/9 |

(Continued)

FOREIGN PATENT DOCUMENTS

| CN | 200937180 | 12/1997 |
| CN | 101192938 A | 6/2008 |

(Continued)

OTHER PUBLICATIONS

Taiwan Search Report for TW application No. 103134903 dated Sep. 21, 2015 (2 pages) [w/English translation].

(Continued)

*Primary Examiner* — Jaweed A Abbaszadeh
*Assistant Examiner* — Keshab Pandey
(74) *Attorney, Agent, or Firm* — Trop Pruner & Hu, P.C.

(57) ABSTRACT

By partitioning the source PHY of a physical layer interface, such as a DisplayPort interface, between multiple power domains, dynamic switching between various power modes with faster entry and exit latency can be achieved in some embodiments. In some embodiments, the scheme may be hardware initiated and autonomous in nature. A controller can switch the PHY in and out of the various power consumption modes, dependent on usage scenarios.

21 Claims, 3 Drawing Sheets

(56) References Cited

U.S. PATENT DOCUMENTS

| | | | | |
|---|---|---|---|---|
| 2010/0188119 A1* | 7/2010 | Masleid | ............. | H03K 3/35625 326/63 |
| 2011/0047397 A1* | 2/2011 | Lee | ....................... | G06F 1/3203 713/324 |
| 2011/0191604 A1* | 8/2011 | Oguro | ................ | G06F 11/2015 713/300 |
| 2011/0208980 A1 | 8/2011 | Brooks et al. | | |
| 2011/0255427 A1* | 10/2011 | Diab | .................. | H04L 12/2697 370/252 |
| 2014/0281626 A1* | 9/2014 | Younger | ............... | G06F 1/3206 713/323 |

FOREIGN PATENT DOCUMENTS

| | | |
|---|---|---|
| CN | 201655187 U | 11/2010 |
| TW | I489256 A | 9/2009 |
| TW | I451233 A | 2/2012 |
| TW | I375400 B | 10/2012 |

OTHER PUBLICATIONS

Taiwan Office Action for TW application No. 103134903 dated Sep. 21, 2015 (7 pages) [w/English translation].

CN office action in corresponding CN application No. 201410719490.0 on Oct. 9, 2016 (6 pages). [no English translation].

* cited by examiner

POWER MANAGEMENT FOR A PHYSICAL LAYER INTERFACE CONNECTING A DISPLAY PANEL TO A DISPLAY TRANSMIT ENGINE

BACKGROUND

This relates generally to processor-based devices that transmit information to be displayed on a display over a physical layer interface.

Conventionally, displays receive the information they are to display from a display transmit engine, such as a processor-based device. The transmission of the information occurs over physical layer interface. The physical layer interface may include data lanes and control channels.

An interface pursuant to the DisplayPort standard version 1.2 includes a main link with four lanes and a side channel, called an auxiliary channel, for link and device management. A hot plug detect interface may also be provided.

Generally, devices that attempt to manage the power consumption of physical layer interfaces, such as the DisplayPort physical layer, control the link as a whole, either allowing data to be transmitted or not. Also, the power can be cut off to the processor-based device. Alternatively, the PHY may be disabled and put in the clock gated mode, but even then it continues to dissipate significant power, which multiplies depending on how long the system stays in this state.

The reason why the PHY cannot be put in an extremely low power mode, such as the power gated mode, is because the PHY is an analog circuit and requires a long latency time to wake up and condition itself to get ready for data transmission. Since the long latency impacts the user experience, generally a PHY is not allowed to go into a power gated state in any mode where low wake up latency is a requirement.

BRIEF DESCRIPTION OF THE DRAWINGS

Some embodiments are described with respect to the following figures.

DETAILED DESCRIPTION

By partitioning the source PHY of a physical layer interface, such as a DisplayPort interface, between multiple power domains, dynamic switching between various power modes with faster entry and exit latency can be achieved in some embodiments. In some embodiments, the scheme may be hardware initiated and autonomous in nature. A controller can switch the PHY in and out of the various power consumption modes, dependent on usage scenarios.

In some embodiments, multiple power islands or separate, isolated domains are created, for example, using a voltage regulator or power switches, to provide granular power management control. A suspend voltage domain powers critical logic blocks that store the status and calibration information of the PHY. Then this information is readily available and the exit latency from a lower power state may be improved, in some embodiments. Similarly, logic and analog circuits are partitioned between the multiple power wells to give better control for power management and reduced latency.

Since the display, including the panel, is a major consumer of power, display power management is an important factor in overall platform power consumption. There is a desire, therefore, to keep the display in a low power mode. To meet this goal, multiple low power states may be introduced with different exit latencies versus the power envelope. A display core or power management controller can put the display PHY in a low power consuming mode based on its low power wake up latency requirements.

One application where the source PHY is put in a lower power consuming mode is panel self-refresh (PSR). When displaying a static image, a panel in PSR keeps repeating the frame with a local frame buffer. The display source can partially power down. During PSR, the PHY transmitter may be turned off or it may continue sending an idle bit pattern. Keeping the PHY transmitters off saves PHY dynamic power consumption, but the PHY continues to leak, as the PHY supply voltage is still on.

To support faster exit latency from lower power consumption modes, configuration registers may be maintained during the lower power mode. Reprogramming configuration registers from driver or basic input/output systems (BIOS) to the PHY takes more time than the exit latency requirement for multiple use case scenarios.

Thus, a suspend voltage domain inside the PHY is kept on during the low power mode to retain the important PHY configuration registers. Retention cells may also store configuration values to reduce leakage power consumption in the low power consuming mode.

At least four power modes may be supported by a display PHY, in one embodiment. A dynamic low power mode may achieve power saving by way of powering down the link when not required in PSR mode, and for quick re-initialization without any need to reconfigure programmable registers.

Figure 3:
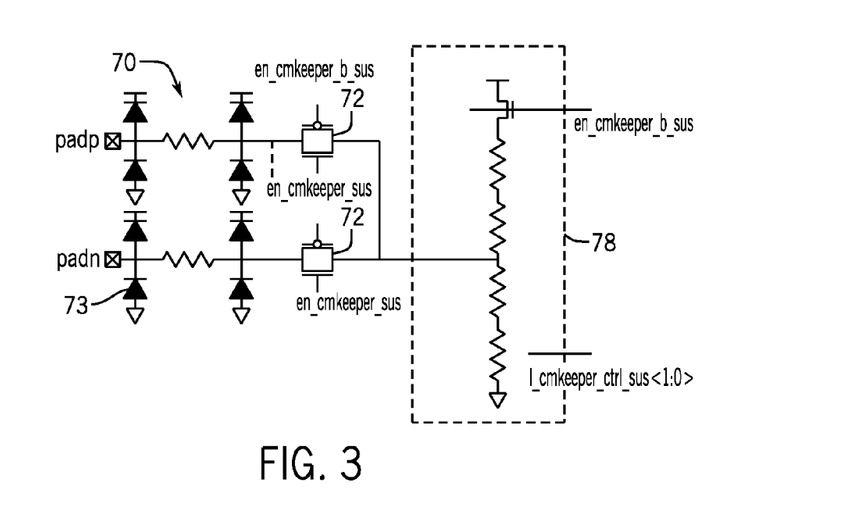
FIG. 3 is a circuit depiction of a common mode keeper, according to one embodiment.

The data to be transmitted by the alternating current (AC) coupled transmitter is generally superimposed on a precharged level of pads p and n (FIG. 3). The precharge level is called the common mode voltage. In the lower power mode, a common mode voltage of each transmitter may be retained. Unless the common mode voltage is maintained, it takes too much time to bring back the common mode voltage of the driver pad to charge the large AC coupled external capacitors coupled to the pad. Since lane power is down during the low power mode, the common mode keeper circuit works in the suspend voltage domain.

Thus, as shown in FIG. 3, there are two transmit driver pads, padp and padn. They are connected to a resistor divider 78 through an electrostatic discharge (ESD) diode matrix 70 and passgate switches 72.

The common mode keeper circuit 78 includes a resistor divider that generates a reduced voltage. A two bit register control bit may be used to decide the current through the resistance ladder in one embodiment. When enabled by the switches 72, the common mode keeper output is connected with both padp and padn.

In addition to retaining the common mode voltage of the pads during low power mode, the transmit driver circuit may tristate to retain the common mode voltage; otherwise, the common mode voltage would leak through the transmit driver pmos transistor. Also, the well of the pmos driver (not shown) and any other pmos devices may be connected with the suspend voltage domain so that a diffusion diode 73 between pad to nwell does not get forward biased when the transmit main supply is off. The transmit circuit is tri-stated when the common keeper is on.

Figure 1:
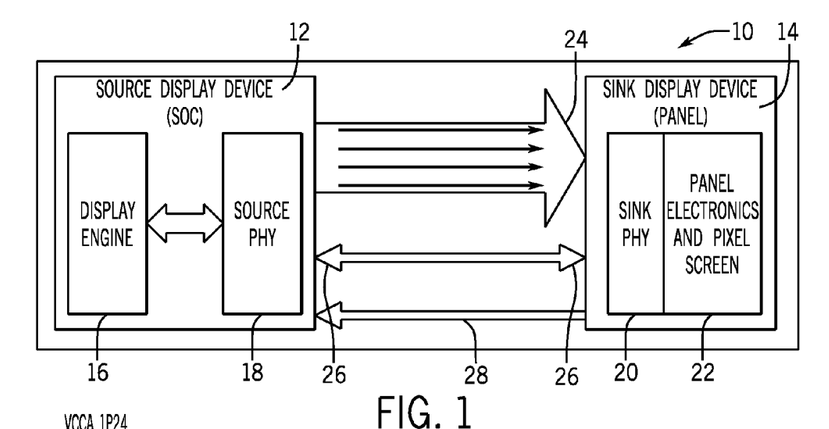
FIG. 1 is a depiction of a physical layer interface, according to one embodiment.

Referring to FIG. 1, a physical layer interface 10, in one embodiment according to the DisplayPort standard version 1.2, includes a source display device 12, such as a system on a chip (SOC), communicating over the interface with a sink display device or panel 14. The display device 12 includes the display engine 16 and the source physical layer or PHY 18. The connection to the sink display device is over an interface that includes a main link 24, including four isochronous streams, a side channel or auxiliary channel 26 for a link and device management, and a hot plug detect (HPD) 28 that includes plug state and interrupt requirements. The sink display device or panel 14 includes a sink PHY 20 and the panel electronics and pixel screen 22, in some embodiments.

Figure 2:
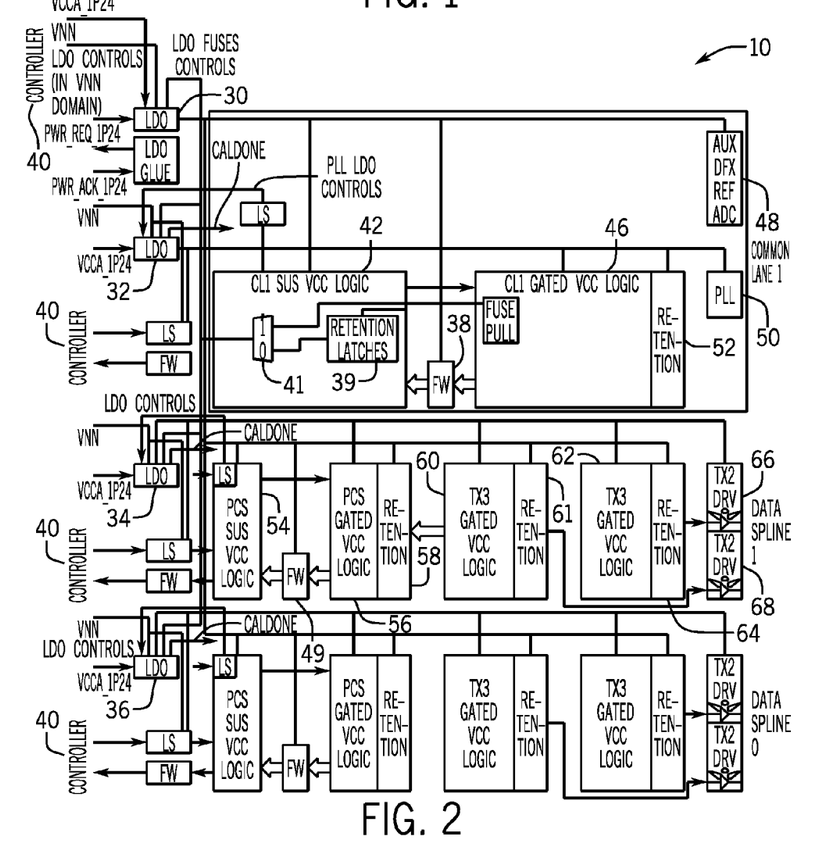
FIG. 2 is a more detailed depiction of the source PHY shown in FIG. 1, according to one embodiment.

Referring to FIG. 2, the input power Vcca_1p24 comes into a low dropout voltage (LDO) 30 or voltage regulator. The LDO 30 controls the suspend power domain, which includes common lane one of the main link 24. Common lane one PLL LDO powers the phase lock loops (PLLs) 50, the auxiliary channel, the TAP network logic (DFX), interface for configuration register read/write, and the analog-to-digital converters 48. A voltage isolating firewall 38 separates the suspend supply logic 42 from a gated supply logic 46. The suspend voltage domain 42 includes the low power finite state machine (FSM), wake up logic, and the LDO power up and power down FSM. It also includes retention latches 39 and a fuse override 41.

The gated logic receives a different signal from the LDO 32. Thus, the two domains 42 and 46 are isolated by firewall (FW) 38. The gated logic supplies the system fabric and the entire read/write arbitration, including the PLL, the controllers, the system management bus, and the dynamic suspend clock controller. A retention 52 maintains the charge on certain storage devices.

The power controller 40 controls the LDO 30 and controls the power supply to the logic 42, 46, and PLL 50. Another domain is supplied by the LDO 34 that includes data spline one. A spline is two lanes logically and physically housed in a hierarchy. It includes a first region 54 that receives power from the LDO 34 for PCS suspend and supply logic, a firewall 49, a gated logic 56, and a retention region 58. A gated logic 60 is for a first of four transmitters and a gated logic 62 is for the second of four transmitters. Each transmitter is connected to a driver 66 or 68 through a retention 61 or 64. A corresponding structure is shown for data spline zero.

Thus, the physical layer has four LDOs that give out control power to a PHY block. Three of these are dynamically controlled by PHY logic. The suspend LDO 30 is entirely controlled by the power management unit of the display device. The suspend LDO, once enabled, outputs a stable voltage supply, such as one volt, that can be treated as always on, as far as the PHY is concerned. Logic connected to the always on power supply may include configuration data and retention latches, low power entry/exit logic, power switch controls, and other essential logic that is common for the physical layer interface, such as DisplayPort interface.

A phase locked loop LDO 32 powers the phase locked loop and other essential common PHY components that are housed in a common lane. The phase locked loop LDO is dynamically controlled by phase logic in the low power mode. The PLL LDO 32 and suspend LDO 30 are embedded inside the common lane one sub-block.

The spline LDOs 34 and 36 (supply gated to a data line) house two transmitters and associated PCS and transmit logic. Each spline LDO is entirely controlled by the PHY and can be dynamically controlled under the influence of low power indications driven by the display controller. There are two spline LDOs for a given DisplayPort PHY that supports four transmitters.

There are two power domains in the display PHY. Vccasus_1p0 or suspend (sus) vcc is an always on supply at 1.05 v in one embodiment. This power is entirely controlled by asserting pwrreq_1p0 for SUS LDO/PG. Vccagated_1p0 or gated vcc and voltage rails are capable of dynamic switching under low power finite state machine controls in display PHY. Vccasus_1p0 is active for this power to be effective. Both the power supplies are distributed to display PHY as part of power mesh abutted via power metal layer from power switch sub-block. The power switch may be thick gate PMOS switch or sophisticated LDO. In case of a thick gate PMOS switch only option, power is supplied as soon as control is enabled appropriately. In case of LDO, power is supplied when LDO is enabled with proper input settings. Calibration is also supported by LDO core to fine tune output voltage. Individual 'o_pwrreq1p0' control is used to control common lane and data lane power switch and there is one each for common lane and date spline for Vccagated_1p0. For Vccasus_1p0 there is a single power switch that is controlled from outside acting as overall power control to display PHY.

To exit the Panel Self Refresh mode, PHY receives a power down reversal signal and entire display PHY may be brought to active state within 3 us-120 us with clocks fully running and transmitter ready to function in one embodiment. After a brief synchronization period (in link training), which lasts a few milliseconds, the display is ready to receive new images (frames), and the system will be working as it did before entering the Panel Self Refresh mode. A wake-up command secondary data packet (SDP) is issued by the controller to notify display panel on PSR exit.

Dynamic Low Power PSR Mode Entry

Dynamic low power mode (PSR mode) is initiated by display core by driving i_powerdown from 0→1 for all active transmit lanes.

In an active data-spline when i_powerdown [1:0] is driven '11', then the entire spline is clock gated by PCS suspend finite state machine. After clock gating, there is no requirement for an PLL clock. This information is communicated by respective data spline to common lane.

When both the data splines are clock gated, common lane suspend logic will evaluate i_powermode [2:0] and take action based on value. Actions in common lane include:

Disable of PLL clock buffer(s)

Disable PLL

Power gating common lane (there is a mask bit to mask power gating of common lane).

Common lane suspend logic also drives down two abutted signals to all data splines as a response to i_powermode bits. Details include:

Put data splines in power gated mode with or without common mode keeper.

Just apply common keeper on transmit drivers. Common mode keeper is used to pull transmit pads to VCC/2 so that precharge time of TX pads (around 100 us) can be avoided during low power exit.
Just remain in clock gated mode. In this case both transmitters in data lane are clock gated.
Dynamic Low Power Exit:

Once data spline is in clock gated/power gated mode, any change in i_powerdown from 1→0 on any of the transmit lanes will bring PLL and respective data lane back to active state. PCS suspend (sus) finite state machine in respective spline looks for this transition.

| i_powerdown [1:0] (for a spline) | i_powermode [2:0] | Comments |
|---|---|---|
| 11 | 001-Lowpower mode1 (SU PSR mode). 010-110 - Reserved. 111 - Low power mode2 (Deep PSR mode). POR for Cherryview. | When i_powerdown [1:0] for a spline is '11' then it enters low power PSR mode as directed by i_powerdown [2:0]. |
| 0X X0 | Don't care | When both bits of i_powerdown [1:0] is '00' for a spline, then both TX lanes in that spline is active. Any TX lane can be put into active state by driving '0' at respective i_powerdown input. When any of i_powerdown [1:0] is '0' within a spline then power gating is not applicable to it. A special case is link width of X1 mode when the combination is either '01' or '10' for i_powerdown [1:0]. In such case clock gating applies to inactive TX lane. |

Note:
Power state transition from 001->111 is allowed.

| i_pwrdown (for a spline) | i_pwrmode [2.0] | Details | TX DRV/ Cmm keeper | lo TX PWR | CL/PLL PWR | PLL Clk buf | dclkp | EXIT LAT | Comments |
|---|---|---|---|---|---|---|---|---|---|
| lpwrreq for SUS LDO/PG driven '0' | | | | | | | | | |
| Don't care | Don't care | Full PHY pwr down mode | OFF/ OFF | OFF | OFF | OFF | OFF | | lpwrreq_sus input must be asserted by either display core or via dfx override bit through SOC TAP data bit to start power sequence for PHY. i_brdpwrgood also must be '1' for PHY to get power. Cold boot is required to start PHY from this state and all resets are to be driven as per spec. |
| TX Active mode - when i_powerdown is '0' (i_powermode is don't care in TX active mode) | | | | | | | | | |
| 00 | Don't care | TX active | ON/OFF | ON | ON | ON | ON | TX active | Active data transmission state for all usable lanes transmitting data up to 5.4 Gbits/s max. |
| 01/10 | Don't care | TX active | ON/OFF | ON | ON | ON | ON | TX active | Unused lane is clock gated. Termed X1 mode. |
| i_powermode [2:0] bits are applicable when i_powerdown [1:0] for a spline is '11' | | | | | | | | | |
| 11 | 000, 010-110 | Clock gated | OFF/OFF | ON | ON | OFF | ON | 110 us | Data lane clock gated mode. Just data path is freezed but no power gating. This is default case. In future when new power |

| | | | | | | | | | |
|---|---|---|---|---|---|---|---|---|---|
| 11 | 001 | Low power CG only mode1 | OFF/ON | ON | ON | OFF | ON | 0.8 us | Clock distribution from PLL EBB is gated. All data lane clocks gated in clock buffer module. But dclkp is free running (must) TX driver is put in high z Usage model is in SU PSR mode where fast exit latency is required. PLL must be ON for SU PSR. |
| 11 | 111 | Low power mode1 (data spline powered off) | OFF/OFF | OFF | OFF | OFF | OFF | 120 us | Usage model is in deep PSR and legacy PSR mode where power saving is of high importance. POR for CHV. Data spline power gated if both i_pwrdown is '11' for a spline. Unused Data lane is clock gated if one of i_pwrdown is '1' for a spline. |

I_powerdown '0' means respective "TX is Active' & power mode bits are don't care.
Following State transitions are allowed
TX Active –>any low power state –>TX Active
TX Active –>001–>111–>TX Active
There is a 3-bit programmable option to override i_powerdown [2:0]. This is in CL1 and CL2 core well domain. Default is input driven.

Power consumption may be reduced by powering down display links that support various DisplayPort 1.2 based low power modes. Quick re-initialization may be achieved without the need to reconfigure programmable registers, in some embodiments. In these embodiments, there is no need to go through the PHY re-intiailization, nor is there any need to notify the software on wake up, which essentially means the wake up time is significantly reduced. It may be easy to shut down the display PHY under the influence of the driver when it is no longer being used. Using retention latches to preserve configuration registers and states in low power mode results in reducing the wake up time requirement. When the PHY is not required to function, it can be completely power gated to reduce the leakage power consumption by turning off all three power gates for a given channel.

Dynamic power gating may be achieved using a finite state machine by taking action based on I_power_states [2:0] bits. To support dynamic power gating, each spline has a dedicated power gate so that each spline can be turned on or off independently.

In many systems-on-a-chip, the supply rail may be eliminated to reduce the number of power rails on the platform and to reduce cost. The power supply is generated from a power rail with an internal LDO. When the PHY is integrated with an LDO, the LDO itself is used as the power gate.

Figure 4:
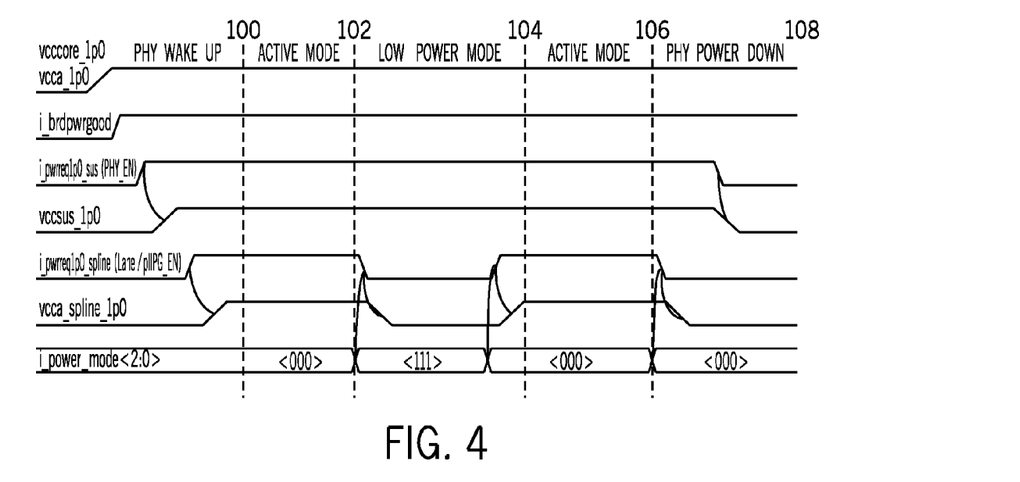
FIG. 4 are plots of the signals from FIG. 2 in different power consumption modes.

The PHY enters different power states by virtue of the I_pwrreq1po_sus (FIG. 4) signal that controls the suspend power gate and acts as the PHY enable signal. The display controller or power management unit drives the signal when the display is required to be on (PHY wake up 100 in FIG. 4). Once the suspend power supply is up, the PHY power management finite state machine is enabled and turns on all other data lane and phase locked loop power domains. After completion of the PHY initialization and global and local compensation, the PHY initiates active mode 102. Any unused data lanes are powered down based on applicable power down rules. Once the display controller or power management unit signals to place the PHY in low power mode (104) by changing I_power mode [2:0] signals from <000> to <111>, the PHY finite state machine puts the PHY into low power mode 104, controlling the power gate of each lane. Thereafter, the PHY may return to active mode 106 or power down 108.

The Panel Self Refresh shuts down the video processor and associated circuit when the image is static, for example, when reading a PDF file. The display has a video memory (such as a frame buffer) to store the contents of the last screen update. The computer shuts down all video circuitry and the display keeps repeating the contents of the last update until there is an update to the screen contents (e.g., you scrolled the document you were reading). The Panel Self Refresh technology works by using a DisplayPort command called 'capture static frame.' When this command is issued by the video engine, the display captures the last image (frame) sent, storing it in its RAM memory (frame buffer). After this command is issued, the DisplayPort main link and PHY are turned off, and the Panel Self Refresh mode is enabled.

The display PHY supports the PSR mode by turning off power to dynamic switching data path logic and at the same time configuration registers and key state variables are preserved by always on suspend voltage domain. The entire power turn off is initiated by display controller during PSR mode. Additionally, this feature is used to power down any unused spline transmitter without affecting functionality, said each spline has dual transmitters housed in a single entity.

To exit the Panel Self Refresh mode, the PHY receives a power down reversal signal and entire display PHY is brought to active mode with clocks fully running and transmitter ready to function. After a brief synchronization period (in link training), which may last a few milliseconds, the display is ready to receive new images (frames), and the system will be working as it did before entering the Panel Self Refresh mode. A wake-up command (secondary data packet) is issued by the controller to notify display panel on PSR exit. This may result in faster exit latency from PSR mode in certain cases.

Display data originates from a video processing engine that has a display rendering feature. Processed data is loaded to display controller via a posted command where frame data is encapsulated with headers appropriate to the operating protocol. 10-bit parallel data is then sent to display PHY where data is serially transmitted to display port panel with appropriate swing and impedance matching on transmission differential lines.

Panel Self Refresh is a command mode (called PSR mode) that the video processing engine uses to shut down the display pipe when the transmitted display image is static. In effect, the controller stops receiving data, creating an ideal situation for the controller and PHY to shut down until the PSR mode is revoked. The display PHY receives the PSR command via an i_powerdown input pin and, in turn, powers down the dynamic switching data path logic to save leakage power. Logic, powered with the always on power supply, may include configuration data in retention latches, low power entry/exit logic, power switch controls and little other essential logic that is common DisplayPort dual link. The display PHY is organized with common lane that has its PLL and control logic besides resistor compensation, JTAG and IOSF interface. Data lanes are organized such that two transmitters and associated PCS logic (front end interface to controller) are contained in a single hierarchy for ease of layout. The two-protocol lane data hierarchy, called a 'spline', is designed in a modular fashion to be used in various other display protocol.

Based on the above table, at least four power modes may be supported by display PHY:
1. Power saving by way of powering down link when not required in PSR mode.
2. Quick re-initialization without need to reconfigure programmable registers. Complete PHY re-initialization without preserving configuration registers have pitfalls; ie to notify driver software on wake up, reprogramming all registers, making controller bring up power and remove reset to start PHY.

With a retention latch to preserve configuration registers and states, wake up time requirement may be reduced.

There are two power domains in display PHY:
Vccasus_1p0 aka sus vcc is always on supply. This power is entirely controlled by P-unit by asserting pwrreq_1p0 for SUS LDO/PG.
Vccagated-1p0 aka gated vcc and voltage rails are capable of dynamic switching under low power fsm controls in display PHY.

Both the power supplies are distributed to display PHY as part of power mesh abutted via power metal layer from power switch sub block. Power switch may be thick gate PMOS switch or sophisticated LDO. In case of thick gate PMOS switch only option, power is supplied as soon as control is enabled appropriately. In case of LDO, power is supplied when LDO is enabled with proper input settings. Calibration is also supported by LDO core to fine tune output voltage. Individual 'o_pwrreq1p0' control is used to control the common lane and data lane power switch and there is one each for common lane and data spline for Vccagated_1p0. For Vccasus_1p0 supply there is a single power switch that is controlled from outside acting as overall power control to display PHY.

Display PHY may be notified upon entering/exiting 'panel self refresh' by display controller. There are two power states for active lane in display PHY.
ON state where display PHY is active and ready to transmit 10-bit data from controller at transmit buffer clock rate (TBC).
Panel self refresh state. This is dynamic low power state where 'vccagated_1p0' power rail is cutoff.

Display PHY can be programmed to handle a dynamic low power state in the following ways:
1. Complete 'vccagated_1p0' power cutoff for PLL and data lanes. This can save power to maximum possible and uses suspend_logic for entry/exit sequence during low power state. Once power is switched off and phy in equilibrium, external controller can remove i_pwrreq1p0 for susvcc for complete PHY shutdown.
2. 'vccagated_1p0' supply ON for PLL but PLL is disabled.
3. 'vccagated_1p0' supply and PLL ON but entire dynamic logic clock gated in clock buffer module and transmit pads driven to high impedance.

Figure 5:
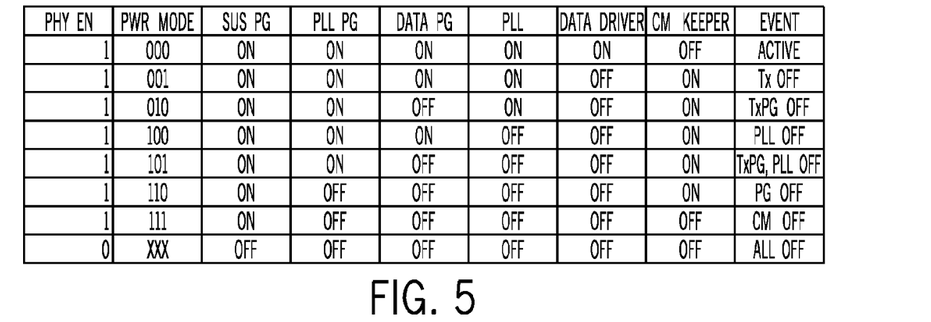
FIG. 5 is a table showing the display PHY low power states, according to one embodiment.

FIG. 5 shows the different low power states, according to one embodiment. The different states for I_power down [1:0] for a spline are 11, 0X, and X0. At 11, the I_power mode [2.0] can be either 001 for low power mode one for the selective update PSR mode, when only modifications are transmitted, or 111 for a low power mode 2, which is a deep PSR mode. When I_power down [1:0] for a spline is 11, then it enters the low power PSR mode, as directed by I_power down [2:0].

If I_power down [1:0] is either 0X or X0, then it does not matter what I_power mode [2:0] is. When both bits of I_power down [1:0] are '00' for a spline, then both transmit lanes in that spline are active. Any transmit lane can be put into the active state by driving zero at the respective I_power down input. When any I_power down [1:0] is zero within a spline, then power gating is not applicable to it.

The signal 1_pwrreq1p0_sus input may be asserted by the display core to start the power sequence for a PHY.

In the table shown in FIG. 5, the PHY enabled bit (EN) can be one to enable the PHY or zero when everything is off. The power mode can be 000, 001 for transmit off, 010 for transmit power gate off, 100 for PLL off, 101 for transmit gate and PLL off, 110 for power gate off, and 111 for common mode keeper off. The headings SUSPG, PLLPG, and data PG all represent whether the particular power gate in question is either on or off. Thus, the suspend power gate is always on except when everything is off, the PLL power gate is on except in power modes 110 and 111 and when everything is off, and the data power gate is on when the event is active or transmitter off, off when the transmit power gate is off, is on when the PLL power gate is off and is on when the transmit gate and PLL power gates are off. Otherwise, it is off. The PLL power gate is always on in the active, transmitter off, and transmitter power gate off events. The date driver is normally on in active mode and off all of the rest of the time and the common mode keeper is off in the active mode and is on in all other event situations, other than all off and common mode keeper off.

Of course, FIG. 5 shows only one embodiment and other embodiments are certainly contemplated by those skilled in the art.

Figure 6:
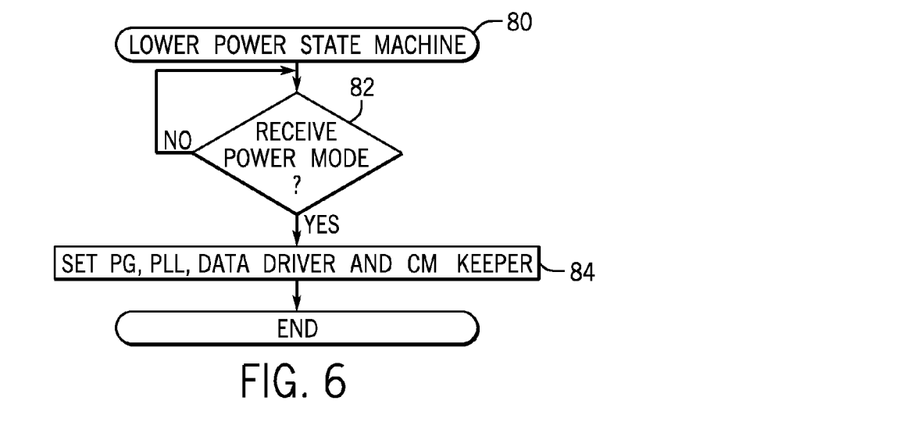
FIG. 6 is a flow chart for one embodiment.

FIG. 6 is a flow chart for a lower power state machine which, in one embodiment, may be a finite state machine. The lower power state machine 30 may be implemented in software, firmware and/or hardware. In software and firmware embodiments, it may be implemented by computer executed instructions stored in one or more non-transitory computer readable media, such as a magnetic, optical, or semiconductor storage.

The sequence 80 beings by receiving a power mode at diamond 82. If a power mode is received, then the power gate, PLL, data driver, and common mode keepers are set, according to FIG. 5, as indicated in block 84, and then the flow ends. If no power mode is received, then the sequence simply waits for a power mode selection.

Figure 7:
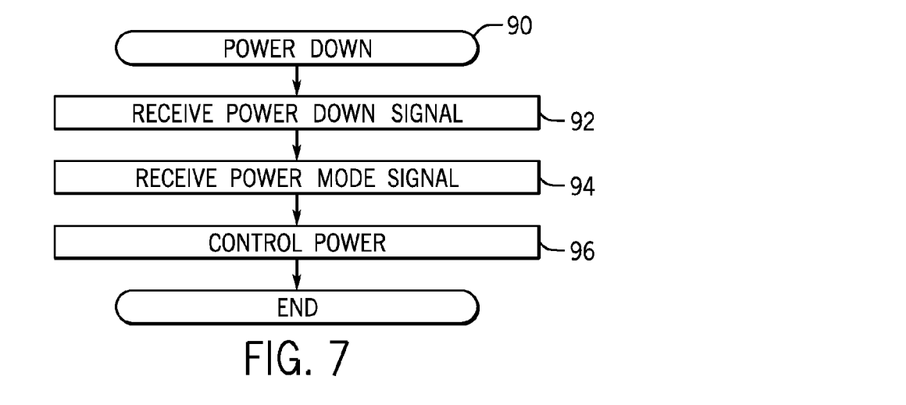
FIG. 7 is a flow chart for another embodiment.

FIG. 7 is a flow chart for a power mode sequence 90 in accordance with one embodiment. It may be implemented in software, firmware and/or hardware. In software and firmware embodiments it may be implemented by computer executed instructions stored in one or more non-transitory computer readable media, such as magnetic, optical, or semiconductor storage.

The power down sequence 90 begins by receiving a power down signal, as indicated in block 92. Then a power mode signal is received, as indicated in block 94. Finally, the power is controlled (block 96) in accordance with the power down and power mode signals previously received.

The following clauses and/or examples pertain to further embodiments.

One example embodiment may be a method comprising providing at least two isolated power domains for a physical layer interface from a source PHY to a sink PHY in a display, a first power domain being always on and supplying logic blocks that store status and configuration information needed to power up the source PHY, and a second power domain, higher in voltage than said first domain, and being a power gated domain for a common lane, and providing a common mode voltage keeper to retain a common mode voltage after a power down, said voltage needed in a higher power consumption state. The method may also include using said keeper to retain the common mode voltage for the first power domain. The method may also include tristating a transmit driver circuit in the first power domain. The method may also include providing a pair of transmit driver pads coupled to a voltage divider to supply power to said pads. The method may also include precharging said pads. The method may also include providing a third separate, isolated power domain for a data spline. The method may also include coupling a pair of transmitters to said data spline. The method may also include implementing panel self refresh using said isolated power domains by turning off power to logic in said second domain while maintaining configuration registers in said first domain. The method may also include powering down the first domain before the second domain. The method may also include implementing a DisplayPort interface.

In another example embodiment may be one or more non-transitory computer readable medium storing instructions for execution to perform a sequence comprising providing at least two isolated power domains for a physical layer interface from a source PHY to a sink PHY in a display, a first power domain being always on and supplying logic blocks that store status and configuration information needed to power up the source PHY, and a second power domain, higher in voltage than said first domain, and being a power gated domain for a common lane, and providing a common mode voltage keeper to retain a common mode voltage after a power down, said voltage needed in a higher power consumption state. The medium may also include using said keeper to retain the common mode voltage for the first power domain. The medium may also include tristating a transmit driver circuit in the first power domain. The medium may also include providing a pair of transmit driver pads coupled to a voltage divider to supply power to said pads. The medium may also include precharging said pads. The medium may also include providing a third separate, isolated power domain for a data spline. The medium may also include coupling a pair of transmitters to said data spline. The medium may also include implementing panel self refresh using said isolated power domains by turning off power to logic in said second domain while maintaining configuration registers in said first domain. The medium may also include powering down the first domain before the second domain. The medium may also include implementing a DisplayPort interface.

Another example may be a source display device comprising a display engine and a source PHY coupled to said engine, including at least two isolated power domains for a physical layer interface from a source PHY to a sink PHY in a display, a first power domain being always on and supplying logic blocks that store status and configuration information needed to power up the source PHY, and a second power domain, higher in voltage than said first domain, and being a power gated domain for a common lane and a common mode voltage keeper to retain a common mode voltage after a power down, said voltage needed in a higher power consumption state. The device may also include said keeper to retain the common mode voltage for the first power domain. The device may also include a pair of transmit driver pads coupled to a voltage divider to supply power to said pads. The device may also include a third separate, isolated power domain for a data spline. The device may also include a pair of transmitters, said transmitters coupled to said data spline. The device may also include wherein said source PHY is a DisplyPort PHY.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
providing at least two isolated power domains for a physical layer interface from a source PHY to a sink PHY in a display, a first power domain being always on and supplying logic blocks that store status and configuration information needed to power up the source PHY, and a second power domain, higher in voltage than said first domain, and being a power gated domain for a common lane;
providing a common mode voltage keeper to retain a common mode voltage after a power down, said voltage needed in a higher power consumption state; and
providing a third separate, isolated power domain for a data spline.

2. The method of claim 1 including using said keeper to retain the common mode voltage for the first power domain.

3. The method of claim 2 including tristating a transmit driver circuit in the first power domain.

4. The method of claim 1 including providing a pair of transmit driver pads coupled to a voltage divider to supply power to said pads.

5. The method of claim 4 including precharging said pads.

6. The method of claim 1 including coupling a pair of transmitters to said data spline.

7. The method of claim 1 including implementing panel self refresh using said isolated power domains by turning off power to logic in said second domain while maintaining configuration registers in said first domain.

8. The method of claim 1 including implementing a DisplayPort interface.

9. At least one non-transitory computer readable medium storing instructions for execution to perform a sequence comprising:
providing at least two isolated power domains for a physical layer interface from a source PHY to a sink PHY in a display, a first power domain being always on and supplying logic blocks that store status and configuration information needed to power up the source PHY, and a second power domain, higher in voltage than said first domain, and being a power gated domain for a common lane;
providing a common mode voltage keeper to retain a common mode voltage after a power down, said voltage needed in a higher power consumption state; and
providing a third separate, isolated power domain for a data spline.

10. The medium of claim 9, said sequence including using said keeper to retain the common mode voltage for the first power domain.

11. The medium of claim 10, said sequence including tristating a transmit driver circuit in the first power domain.

12. The medium of claim 9, said sequence including providing a pair of transmit driver pads coupled to a voltage divider to supply power to said pads.

13. The medium of claim 12, said sequence including precharging said pads.

14. The medium of claim 1, said sequence including coupling a pair of transmitters to said data spline.

15. The medium of claim 9, said sequence including implementing panel self refresh using said isolated power domains by turning off power to logic in said second domain while maintaining configuration registers in said first domain.

16. The medium of claim 9, said sequence including implementing a DisplayPort interface.

17. A source display device comprising:
a display engine;
a source PHY coupled to said engine, including at least two isolated power domains for a physical layer interface from a source PHY to a sink PHY in a display, a first power domain being always on and supplying logic blocks that store status and configuration information needed to power up the source PHY, and a second power domain, higher in voltage than said first domain, and being a power gated domain for a common lane and a common mode voltage keeper to retain a common mode voltage after a power down, said voltage needed in a higher power consumption state; and
a third separate, isolated power domain for a data spline.

18. The device of claim 17 including said keeper to retain the common mode voltage for the first power domain.

19. The device of claim 17 including a pair of transmit driver pads coupled to a voltage divider to supply power to said pads.

20. The device of claim 17 including a pair of transmitters, said transmitters coupled to said data spline.

21. The device of claim 17 wherein said source PHY is a DisplayPort PHY.

* * * * *

UNITED STATES PATENT AND TRADEMARK OFFICE
CERTIFICATE OF CORRECTION

PATENT NO. : 9,612,647 B2
APPLICATION NO. : 14/074985
DATED : April 4, 2017
INVENTOR(S) : Sathyanarayanan Gopal et al.

Page 1 of 1

It is certified that error appears in the above-identified patent and that said Letters Patent is hereby corrected as shown below:

In the Claims

Column 14: Line 23 Claim 14: 1 should be 9

Signed and Sealed this
Tenth Day of July, 2018

Andrei Iancu
*Director of the United States Patent and Trademark Office*